US008508662B1

(12) United States Patent
Sahu et al.

(10) Patent No.: US 8,508,662 B1
(45) Date of Patent: Aug. 13, 2013

(54) POST DE-INTERLACER MOTION ADAPTIVE FILTER FOR SMOOTHER MOVING EDGES

(75) Inventors: Shilpi Sahu, Bangalore (IN); Sanjay Garg, Bangalore (IN); Nikhil Balram, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 1007 days.

(21) Appl. No.: 12/481,482

(22) Filed: Jun. 9, 2009

Related U.S. Application Data

(60) Provisional application No. 61/073,954, filed on Jun. 19, 2008.

(51) Int. Cl.
*H04N 7/01* (2006.01)
*H04N 11/22* (2006.01)

(52) U.S. Cl.
USPC .......................................................... 348/452

(58) Field of Classification Search
USPC ................. 348/448, 452, 564, 607, 620, 701; 352/38
See application file for complete search history.

(56) References Cited

U.S. PATENT DOCUMENTS

| 7,405,766 | B1* | 7/2008 | Chou et al. ..................... 348/448 |
| 2004/0012720 | A1* | 1/2004 | Alvarez ......................... 348/607 |
| 2004/0130680 | A1* | 7/2004 | Zhou et al. ...................... 352/38 |
| 2005/0078214 | A1* | 4/2005 | Wong et al. ..................... 348/452 |
| 2005/0168633 | A1* | 8/2005 | Neuman et al. ............... 348/448 |
| 2006/0215058 | A1* | 9/2006 | Lu et al. ......................... 348/452 |
| 2006/0285010 | A1* | 12/2006 | Wang et al. ..................... 348/452 |
| 2007/0047647 | A1* | 3/2007 | Lee et al. ................. 375/240.12 |
| 2008/0036908 | A1* | 2/2008 | Wong et al. ..................... 348/448 |

* cited by examiner

*Primary Examiner* — Nasser Goodarzi
*Assistant Examiner* — An Nguyen

(57) ABSTRACT

A system and method for motion adaptively filtering a de-interlaced video signal. This motion adaptive filtering may be accomplished by using a motion value determined during motion adaptive de-interlacing. The motion value may be used to adjust the amount of filtering to be applied to the de-interlaced signal. Edges in the signal representing motion my be filtered more than static regions. A pixel by pixel difference between multiple signal frames, calculated during motion adaptive de-interlacing, may be used to determine the motion value. A motion adaptive filter may be implemented either separately from the motion adaptive de-interlacer or incorporated as part of the motion adaptive de-interlacer.

18 Claims, 9 Drawing Sheets

POST DE-INTERLACER MOTION ADAPTIVE FILTER FOR SMOOTHER MOVING EDGES

CROSS-REFERENCE TO RELATED APPLICATIONS

This application claims the benefit of priority from U.S. provisional patent application Ser. No. 61/073,954, filed Jun. 19, 2008, entitled POST DE-INTERLACER MOTION ADAPTIVE LPF FOR SMOOTHER MOVING EDGES. That provisional application is hereby incorporated by reference in its entirety.

BACKGROUND

1. Field

Aspects of the present invention relate generally to the field of video signal processing and adaptive de-interlacing.

2. Description of the Related Art

A video processor unit may perform several different video enhancements including interlacing, de-interlacing, edge enhancement, up-scaling, etc. When an input signal is interlaced, de-interlacing of the signal may be required before other functions are performed. If the output of a video processor unit is an interlaced signal, but a downstream processor, e.g. a video display, de-interlaces the signal, a poor de-interlacer at the display may artificially introduce frequencies that can create artifacts and introduce aliasing or pixellations known as "jaggies" around the moving areas of the signal regardless of the quality of the video processor unit. Furthermore, if the signal is up-scaled, stray jaggies may be emphasized.

SUMMARY

Embodiments of the present invention provide a system and method for motion adaptively filtering a de-interlaced video signal. This motion adaptive filtering may be accomplished by using a motion value determined during motion adaptive de-interlacing of an input video signal. The motion value may be used to adjust the amount of filtering applied to the de-interlaced signal. The motion value may be based on a pixel by pixel difference between multiple signal frames, calculated during motion adaptive de-interlacing. The filtering may be accomplished with a low pass filter (LPF). A motion adaptive filter may be implemented separately from the motion adaptive de-interlacer or incorporated as part of the de-interlacer. A motion adaptive filter may be responsive to film input by limiting the filtering applied to such input. A motion adaptively de-interlaced and filtered signal may be scaled and interlaced to output an interlaced video signal.

BRIEF DESCRIPTION OF THE DRAWINGS

The present invention is described herein with reference to the accompanying drawings, similar reference numbers being used to indicate functionally similar elements.

DETAILED DESCRIPTION OF EMBODIMENTS

Objects and advantages of the present invention will become apparent from the following detailed description.

Figure 1:
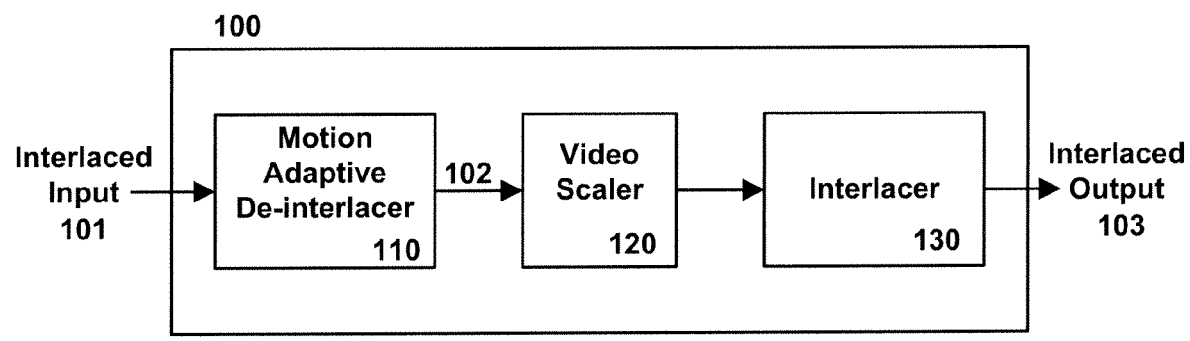
FIG. 1 shows one embodiment of a video processor unit.

A video processor unit 100 as shown in FIG. 1 may anticipate and compensate for poor quality downstream de-interlacing by implementing an additional filter. Here, video processor unit 100 is composed of a motion adaptive de-interlacer 110, a video scaler 120 and an interlacer 130. The output in this instance is an interlaced signal 103. Implementing a filter in video scaler 120 or in interlacer 130, may help limit the occurrence of jaggies by removing high frequencies that may create aliasing artifacts, but it may also result in a softer picture and static areas of the signal may lose some fine details. However, if the filter is motion adaptive, only the moving edges should be softened while the details of the static areas should remain sharp.

In FIG. 1, motion adaptive de-interlacer 110 converts an interlaced input signal 101 into a progressive scan intermediate signal 102 consisting of alternating original and generated lines. The generated lines may be spatially generated if the pixels are determined to involve motion, otherwise they may be temporally generated. A spatially generated line may use pixels from the surrounding frame to fill in the interpolated areas. A temporally generated line may use pixels from a neighboring frame to fill in the interpolated lines.

Up-scaling is typically necessary when the input signal is standard definition (SD), often 480i, and the desired output is high definition (HD), usually 1080i or 1080p. If video processor unit 100 first de-interlaces an SD interlaced input signal 101, some residual imperfections may remain in de-interlaced, progressive scan intermediate signal 102. Up-scaling may have the effect of enhancing any artifacts or imperfections that may be introduced or exist in the signal. Therefore, reducing those imperfections by using a motion adaptive filter before they are enhanced and propagated is desirable.

Figure 2:
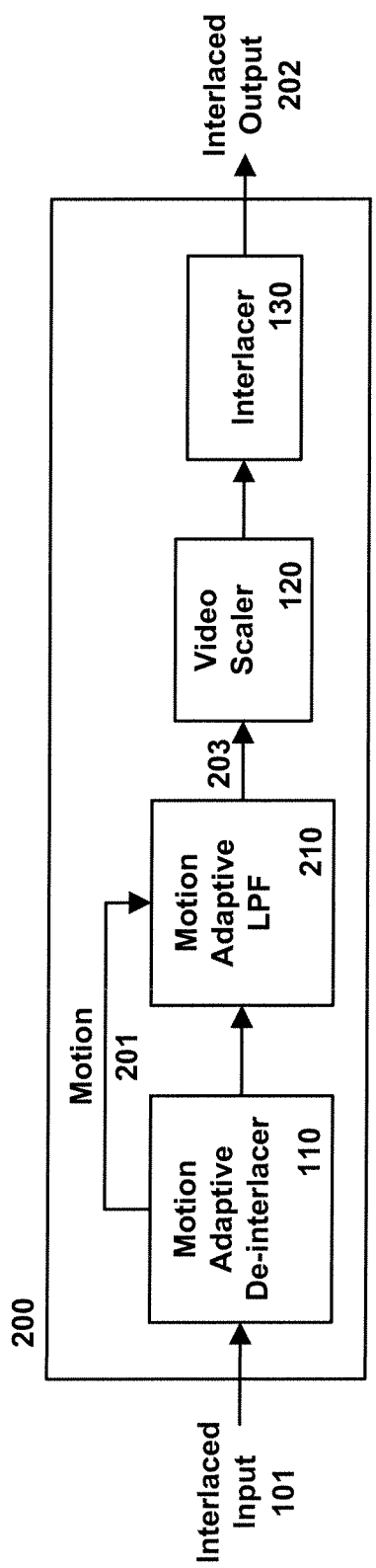
FIG. 2 shows one embodiment of a video processor unit with an additional motion adaptive low-pass filter.

FIG. 2 shows one embodiment of a video processor unit with an additional spatial low-pass filter (LPF). Video processing unit 200 comprises a motion adaptive de-interlacer 110, a video scaler 120, an interlacer 130, and a motion adaptive LPF 210. The input may be an interlaced video signal 101 and the output in this instance may be an interlaced video signal 202 with filtered moving edges. The performance of motion adaptive LPF 210 may be controlled by a per-pixel motion value 201 calculated in motion adaptive de-interlacer 110 as the absolute value of the pixel by pixel difference between two or three signal frames. Generally, if the change in a pixel between two frames is above a threshold value, the pixel may be determined to be in motion. If the change in a pixel between two frames is below the threshold value, the pixel may be deemed static. The static areas of the signal should not be filtered, so as to maintain maximum spatial resolution. With a higher degree of motion in the signal, more filtering may be needed to remove the stray jaggies that may appear around the moving edges.

Motion adaptive LPF 210 may be implemented as either a two-dimensional LPF or orthogonal horizontal and vertical LPFs in series. The filter need not be very sophisticated; a simple 3 tap filter in both the horizontal and vertical directions may be sufficient to remove jaggy artifacts. The buffers required for filtering or delaying motion bits can be shared from an existing module, thereby limiting the cost of implementation. The combination of motion adaptive de-interlacer 110 and motion adaptive LPF 210 outputs an edge adaptive intermediate signal 203.

In one embodiment, if there is no motion because the pixels are static, the motion adaptive filter may act as an all pass filter; however, if there is maximum motion, the filter may be a 3 tap LPF, for example, with coefficients [1 2 1]/4. An intermediate motion value may be determined using the motion bits to blend the filtered and the unfiltered output. In that case the filter's coefficients may be calculated as in Equation 1 where $h_{lpf}$ represents the filter coefficients when there is maximum motion and the motion variable may be based on motion value 201 as input to motion adaptive LPF 210 from motion adaptive de-interlacer 110.

$$h_{motion} = (h_{lpf} * motion + 16 - motion * [0\ 1\ 0])/16 \quad (1)$$

In one embodiment, $h_{lpf}$ may be tunable to vary the amount of filtering. Then the filter may be implemented as in Equation 2, where s is a programmable sharpness factor indicating the desired sharpness of the filtered output. The programmable sharpness factor may be a constant value, set by the user, and stored in a programmable register. Additionally or alternatively, the sharpness factor may vary depending on the motion value such that low motion regions may have a higher desired sharpness factor than the edges representing motion. For example, with maximum sharpness (s=64), the filter is an all pass filter, and with minimum sharpness (s=0), the filter is $h_{lpf}$=[1 2 1]/4.

$$h_{lpf} = [(64-s)(128+2s)(64-s)]/256 \quad (2)$$

Figure 3:
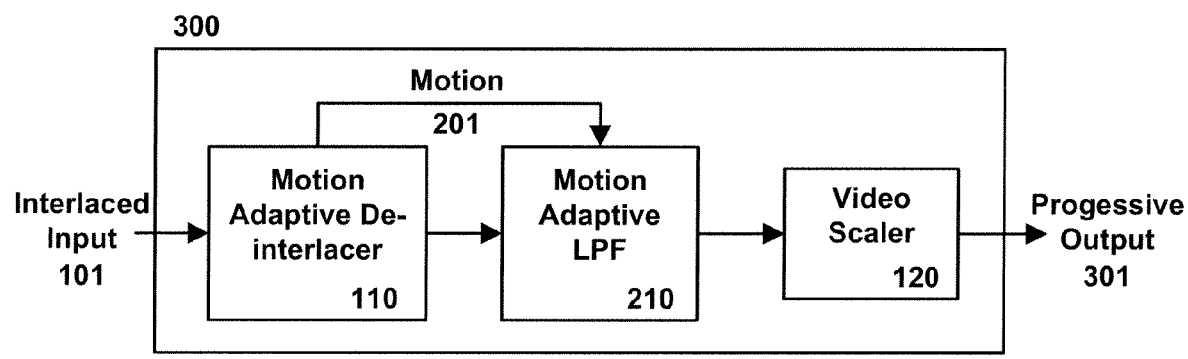
FIG. 3 shows one embodiment of a video processor unit with progressive output.

FIG. 3 shows one embodiment in which the output of a video processor unit 300 may not be limited to interlaced output. Video processor unit 300 comprises a motion adaptive de-interlacer 110, a motion adaptive LPF 210 influenced by motion value 201, and a video scaler 120. The input may be an interlaced signal 101. In this case, the output 301 of video processor unit 300 is a progressive scan signal. Any residual jaggies or other artifacts or imperfections that exist after de-interlacing at motion adaptive de-interlacer 110 may be filtered out or made less visible with the implementation of motion adaptive LPF 210.

Figure 4:
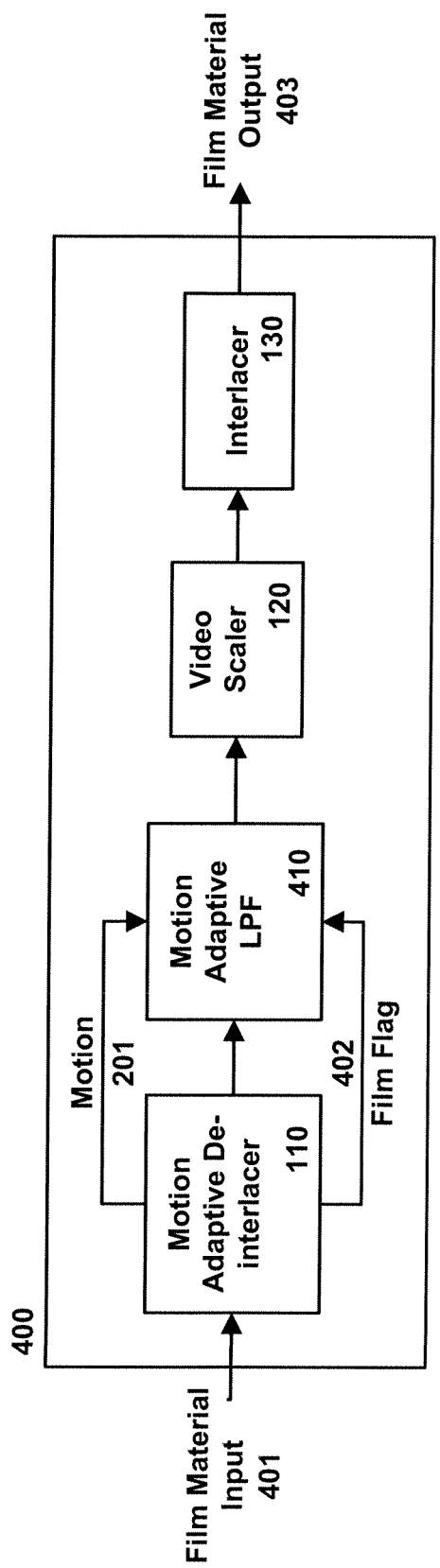
FIG. 4 shows one embodiment of a video processor unit with a motion adaptive low-pass filter sensitive to film input.

In one embodiment shown in FIG. 4, the motion adaptive filter may be sensitive to a film mode flag 402 available from the de-interlacer. Here, video processor unit 400 comprises a motion adaptive de-interlacer 110, a motion adaptive LPF 410 influenced by motion value 201, a video scaler 120 and an interlacer 130. If input 401 to video processor unit 400 is film material, motion adaptive de-interlacer 110 detects the film mode, and sets film mode flag 402. Motion adaptive de-interlacer 110 may not provide a progressive scan, de-interlaced intermediate signal when the input video signal is film material, therefore the typical jaggies may not be introduced into the signal, thus making motion adaptive filtering unnecessary. When film mode flag 402 is set, motion adaptive LPF 410 may not need to filter the film material input 401. In this case, output signal 403 of video processor unit 400 may be the film material input 401, scaled by video scaler 120 and interlaced by interlacer 130.

Figure 5:
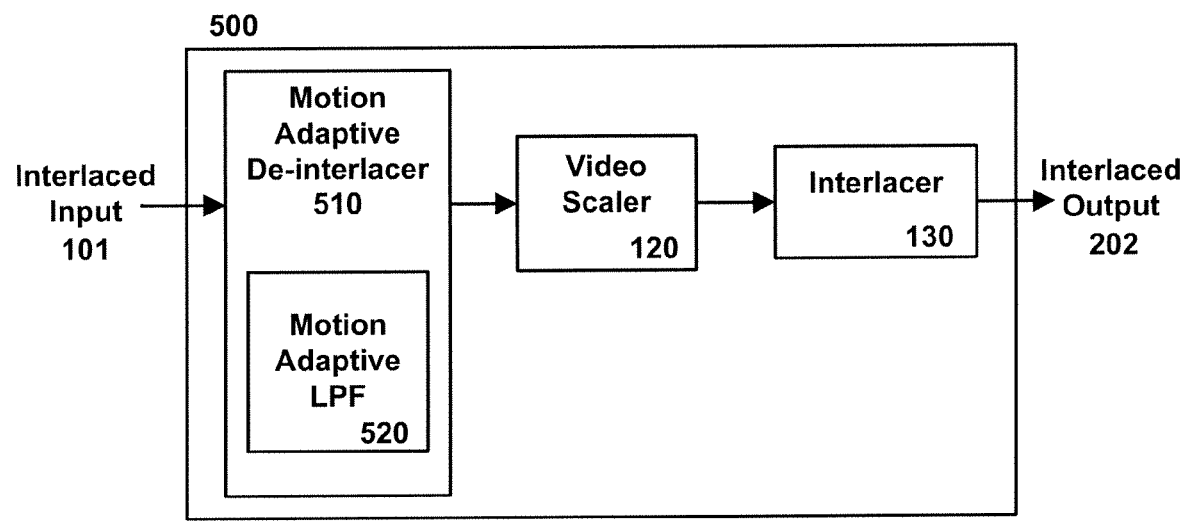
FIG. 5 shows one embodiment with a motion adaptive low-pass filter implemented within a motion adaptive de-interlacer.

In one embodiment shown in FIG. 5, a motion adaptive filter may be implemented as part of the de-interlacer. Here video processor unit 500 comprises a motion adaptive de-interlacer 510, a video scaler 120 and an interlacer 130. The input may be an interlaced signal 101 and the output may be interlaced output 202. Implemented as part of motion adaptive de-interlacer 510, motion adaptive LPF 520 has direct access to lines within the frame and to a motion value, represented by 201 in FIG. 2, as it is computed by the motion adaptive de-interlacer 510. Video processor unit 500 may save on line buffer requirements compared to a separate LPF implementation.

In one embodiment, a motion adaptive LPF can be combined with a spatial filter in the motion adaptive de-interlacer as a single combined filter. The combination of two filters implemented in series may result in a single filter expressed by the convolution of the first two. For convolution, where two filters with impulse response x(m) of M taps (x(0), x(1), . . . x(M−1)) and y(n) of N taps (y(0), y(1), . . . y(N−1)) respectively are placed in series, the impulse response of the combined filter may be represented by z(t)=Σx(m). y(t−m)=Σy(n). x(t−n) where 0≤m<M, or where n is 0≤n<N and t ranges from 0 to N+M−1.

Figure 6:
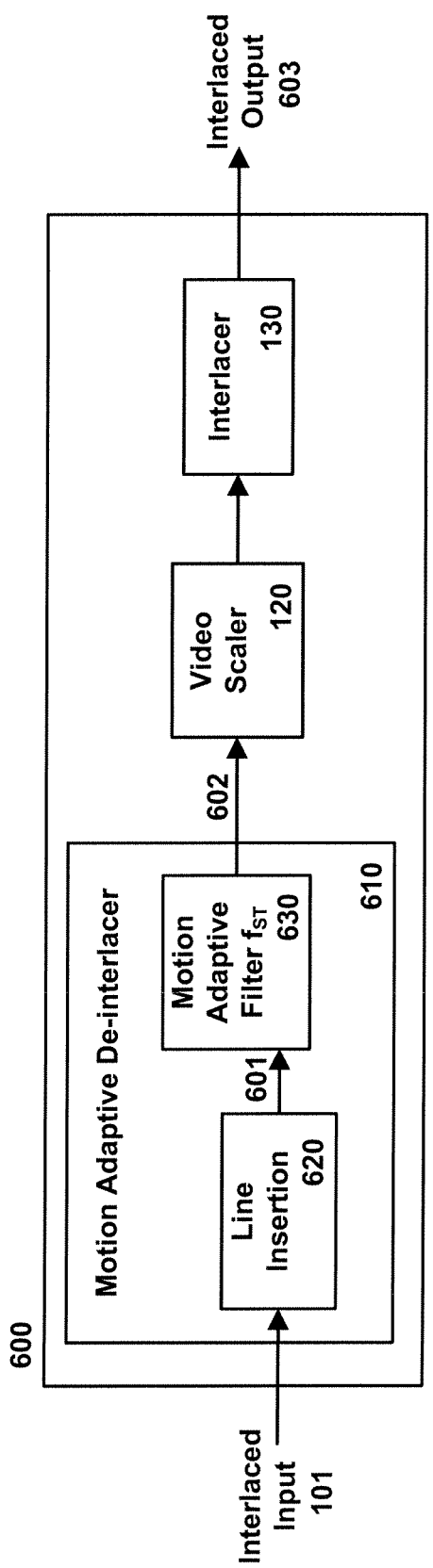
FIG. 6 shows one embodiment with a motion adaptive filter combined with a spatial filter in a motion adaptive de-interlacer.

FIG. 6 shows a video processor unit 600 with additional detail in motion adaptive de-interlacer 610. Video processor unit 600 also comprises a video scaler 120 and an interlacer 130. Input 101 and output 603 may be interlaced video signals. Motion adaptive de-interlacer 610 comprises an alternate line insertion module 620 and a motion adaptive filter 630. The output of the motion adaptive de-interlacer may be a de-interlaced, progressive scan, intermediate signal 602.

A motion adaptive de-interlacer may contain a motion adaptive spatio-temporal filter $f_{ST}$ that may be represented as a function of motion (m) as in Equation 3.

$$f_{ST} = \begin{pmatrix} 0 & 0.5m & 0 \\ 0.5(1-m) & 1 & 0.5(1-m) \\ 0 & 0.5m & 0 \end{pmatrix} \quad (3)$$

While original lines pass through the de-interlacer without filtering because the central coefficient of Equation 3 is equal to 1 in all cases, interpolated lines may be generated by a 4 tap spatio-temporal filter as represented by Equation 4. Equation 4 also shows that, for maximum motion (m=1), $f_{ST}$ may go completely spatial. For minimum motion (m=0), as shown in Equation 5, $f_{ST}$ may go completely temporal. For intermediate motion values, the filter $f_{ST}$ is implemented as a blended version of the m=0 and m=1 filters.

$$f_{SPAT} = \begin{pmatrix} 0.5 \\ 1 \\ 0.5 \end{pmatrix} \quad (4)$$

$$f_{TEMP} = (0.5\ 1\ 0.5) \quad (5)$$

Figure 7:
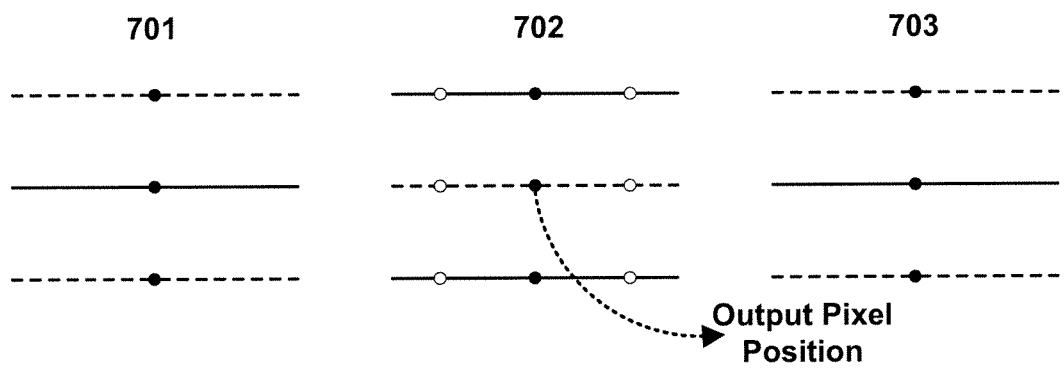
FIG. 7 illustrates a de-interlaced signal after line insertion.

The de-interlaced signal at 601 of FIG. 6 is further illustrated in FIG. 7. Here, 701, 702 and 703 are consecutive frames of the input signal. The white pixels marked in 702 are the spatial neighbors of the de-interlaced pixel to be generated and may be used for edge adaptive spatial de-interlacing. The solid lines represent the original interlaced line positions and the dotted lines represent the generated line positions. The coefficients of $f_{ST}$ may act as weights for the black pixels.

Figure 8:
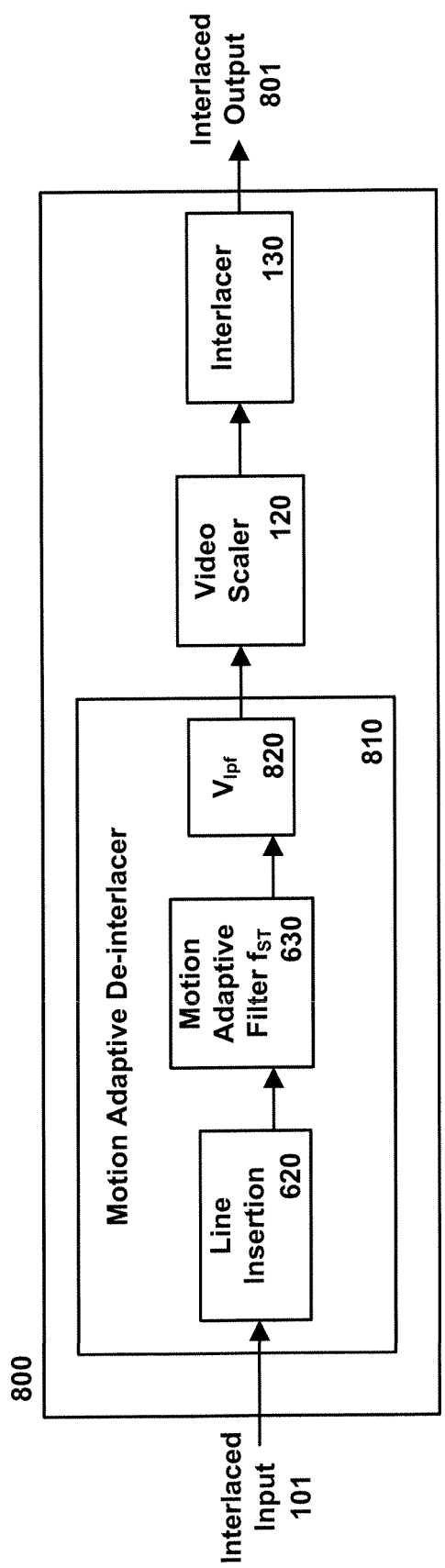
FIG. 8 shows one embodiment of a video processor unit with a combined motion adaptive and spatial filter and a vertical low-pass filter implemented in a motion adaptive de-interlacer.

In one embodiment, it may be desirable to add a vertical LPF $v_{lpf}$ with coefficients [1 2 1]/4 to the motion adaptive de-interlacer as shown in FIG. 8, in order to limit the aliasing artifacts introduced in the de-interlaced signal. Video processor unit 800 may contain a motion adaptive de-interlacer 810 with a vertical LPF 820 and an interlaced output signal 801. The combined spatial response of a motion adaptive filter ($f_{ST}$) 630 with $v_{LPF}$ 820 in motion adaptive de-interlacer 810 may be a vertical 5 tap filter $f_{LPF-SPAT}$ that may be represented by Equation 6.

$$f_{LPF-SPAT} = \begin{pmatrix} 0.125 \\ 0.5 \\ 0.75 \\ 0.5 \\ 0.125 \end{pmatrix} \quad (6)$$

$f_{LPF-SPAT}$ has a smaller spatial pass-band for filtering than the spatial filter $f_{SPAT}$ represented by Equation 6. However, the amount of filtering achieved by vertical LPF 820 may not be sufficient to remove significant vertical aliasing artifacts from the signal. Applying an even smaller pass-band might remove additional aliasing artifacts, but it may also cut off higher frequency details and cause the video output to look soft or dull.

In one embodiment, aliasing artifacts and jaggies may be removed on some directional edges by a combined edge adaptive filter within the motion adaptive de-interlacer. The combined edge adaptive filter may be implemented as an edge adaptive spatial de-interlacer with an LPF where edge adaptive spatial filtering may be performed before the LPF is applied. However, an edge adaptive spatial filter may have many possible directions for interpolation, each requiring a filter. For instance, if there are three possible directions of interpolation (one vertically, one at −45 degrees and the other at 45 degrees), the spatial filter may be a set of three 3×3 two dimensional filters. Three potential spatial filters are shown in Equation 7.

$$f_{S1} = \begin{pmatrix} 0 & 0 & 0.5 \\ 0 & 1 & 0 \\ 0.5 & 0 & 0 \end{pmatrix} f_{S2} = \begin{pmatrix} 0 & 0.5 & 0 \\ 0 & 1 & 0 \\ 0 & 0.5 & 0 \end{pmatrix} f_{S3} = \begin{pmatrix} 0.5 & 0 & 0 \\ 0 & 1 & 0 \\ 0 & 0 & 0.5 \end{pmatrix} \quad (7)$$

If an edge adaptive spatial filter (i.e. $f_{s1}$) is combined with a vertical LPF, each filter may be a 3×5 filter. The combination of the two filters in this case may be accomplished using two-dimensional convolution. Two dimensional convolution may be represented by Z(s, t)=ΣΣx(m, n). y(s−m, t−n)=ΣΣx (k, j). y(s−k, t−j).

A combined 3×5 edge adaptive spatial filter and vertical LPF is shown in Equation 8. Additionally, there may be as many possible combinations and parallel spatial filter implementations as there are possible directions of interpolation. Therefore, if there are nine possible directions of interpolation, there may be nine 9×5 spatial filters. If a two dimensional LPF is implemented instead of a vertical LPF, each spatial filter may be 11×5.

$$f'_{S1} = \begin{pmatrix} 0.0 & 0.0 & 0.125 \\ 0.0 & 0.25 & 0.25 \\ 0.125 & 0.5 & 0.125 \\ 0.25 & 0.25 & 0.0 \\ 0.125 & 0.0 & 0.0 \end{pmatrix} \quad (8)$$

It should be appreciated that where a motion adaptive LPF is implemented as part of a motion adaptive de-interlacer as in FIG. 5, FIG. 6, or FIG. 8, the filter implementation may become complex. Where a motion adaptive LPF filter is implemented separate of a motion adaptive de-interlacer, as in FIG. 2, FIG. 3, and FIG. 4, the filter may be easier to implement and provide for more flexibility.

Figure 9:
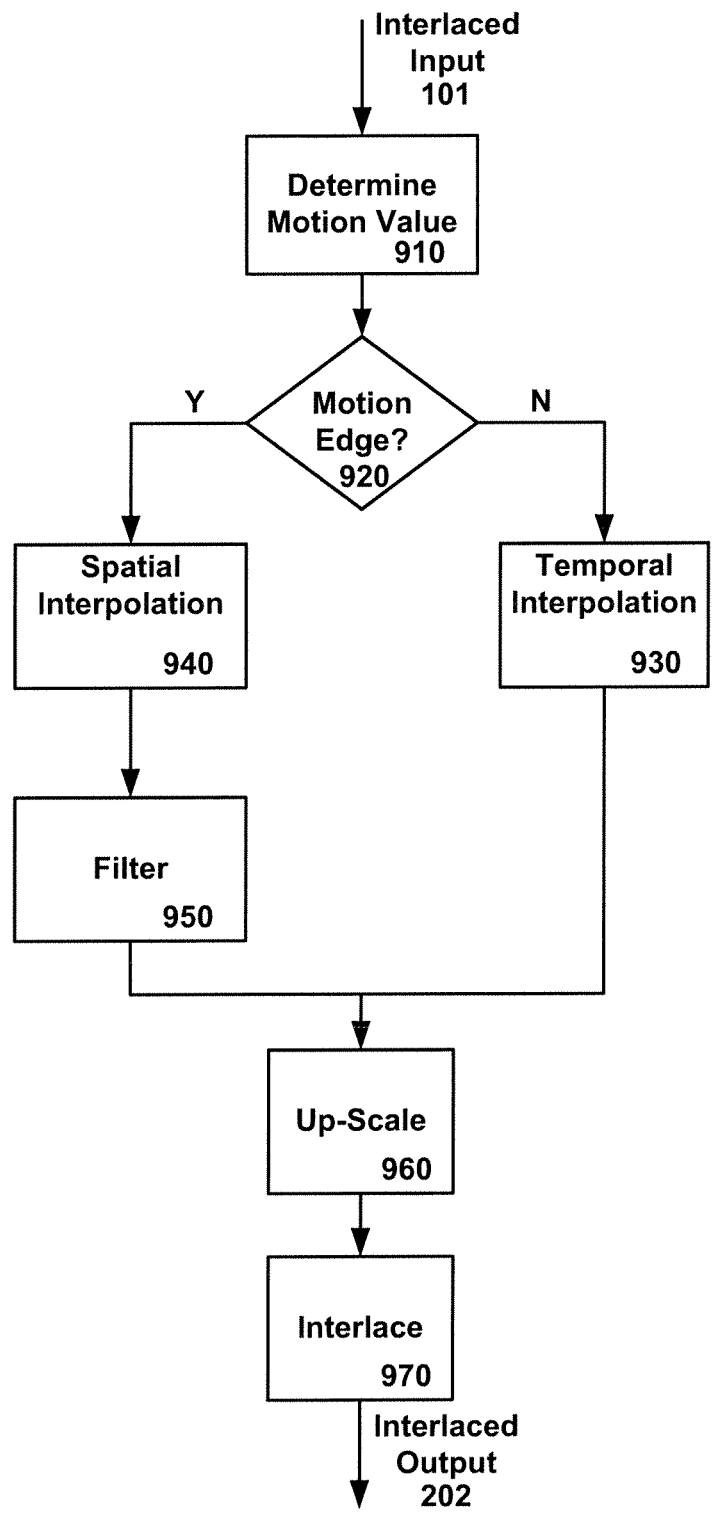
FIG. 9 is a simplified flow diagram illustrating general operation of one embodiment of a method of motion adaptively filtering a motion adaptively de-interlaced video signal.

FIG. 9 is a simplified flow diagram illustrating general operation of one embodiment of a method of motion adaptively filtering a motion adaptively de-interlaced video signal. Implementing a motion adaptive filter may remove aliasing artifacts and jaggies existent in a de-interlaced signal without affecting the sharpness and clarity of the static areas. At block 910, the motion value of each edge in the interlaced input signal 101 may be determined. This may be accomplished by a per-pixel comparison of two or three frames in the signal. At decision block 920, the signal may be identified as part of either a static region or a motion edge. Where the change in pixel value across frames is above a threshold value, those pixels may be determined to be part of an edge representing motion. If the signal is not part of an edge representing motion, determined by a change in pixel values across frames below a threshold, then the signal may be de-interlaced using temporal interpolation at block 930. Temporal interpolation may be accomplished by using uses pixels from a neighboring frame to fill in the interpolated lines. If, at decision block 920, the signal is determined to be part of an edge representing motion, the signal may be de-interlaced using spatial interpolation at block 940. Spatial interpolation may be accomplished by using pixels from the surrounding frames to fill in the interpolated areas. Generally the operation of blocks 910, 920, 930 and 940 may be executed by a motion adaptive de-interlacer.

After interpolation, the edges representing motion may be filtered at block 950 to limit the presence of aliasing artifacts or jaggies. The amount the signal is filtered may vary based on the amount of motion in the signal. For example, edges that represent a small amount of motion may be filtered less than an edge that represents a significant amount of motion. The filtering may be executed by a motion adaptive de-interlacer or by a separate motion adaptive filter. After the motion edges are filtered, the entire signal, both the filtered motion edges and the temporally interpolated static regions may be up-scaled at block 960. After up-scaling, the signal may be interlaced at block 970 to create interlaced output signal 202.

It is noted that the block arrangement in FIG. 9 does not necessarily imply a particular order or sequence of events, nor is it intended to exclude other possibilities. For example, the operations depicted at blocks 910 and 915 may occur substantially simultaneously with each other; similarly, the determination made at decision block 920 may be incorporated in an earlier operation, or may be eliminated in some instances.

Although the above embodiments were described primarily for a luminance signal, they could also be applied to a chrominance signal. Additionally, the input in the above embodiments could be either a progressive scan or an interlaced signal. Any combination of input and output types may be implemented. The video processor unit as described could also be implemented to perform functions other than de-interlacing, i.e. color processing, contrast enhancement, etc. or without resolution enhancement or scaling. It should be appreciated that the filters presented above are exemplary only and that filters of alternate types and sizes may be implemented with alternate coefficients.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method comprising:
   motion adaptively de-interlacing an interlaced video signal, including
   determining a motion value for each edge of a plurality of edges represented in the interlaced video signal, wherein the motion value for each edge of the plurality of edges corresponds to whether the edge is in motion within the interlaced video signal,
   comparing the motion value of each edge of the plurality of edges to a predetermined threshold value, wherein i) portions of the interlaced video signal representing edges in motion have edges whose motion value is above the predetermined threshold value, and ii) portions of the interlaced video signal not representing edges in motion have edges whose motion value is below the predetermined threshold,
   de-interlacing the portions of the interlaced video signal representing edges in motion in accordance with spatial interpolation, and
   de-interlacing the portions of the interlaced video signal not representing edges in motion in accordance with temporal interpolation; and
   motion adaptively filtering the de-interlaced video signal, including
   filtering, in accordance with a first amount, the edges of the plurality of edges whose motion value is above the predetermined threshold value, and
   filtering, in accordance with a second amount, the edges of the plurality of edges whose motion value is below the predetermined threshold value,
   wherein the first amount is greater than the second amount; and
   scaling the motion adaptively filtered de-interlaced video signal and outputting the scaled video directly as a progressive signal or indirectly as a film or interlaced signal by using an interlacer after scaling.

2. The method of claim 1 wherein the motion value comprises a pixel by pixel difference between a plurality of frames in the interlaced video signal.

3. The method of claim 1 wherein the motion adaptively filtering comprises low-pass filtering.

4. The method of claim 1 wherein the motion adaptively filtering comprises tunably filtering such that the motion adaptively filtering is adjustable by a sharpness factor.

5. The method of claim 1 further comprising
   determining if the interlaced video signal is film material, and wherein the amount of motion-adaptively filtering the de-interlaced video signal is set to zero if the interlaced video signal is film material.

6. The method of claim 1 wherein the interlaced video signal is a luminance signal, a chrominance signal, a progressive scan signal or an interlaced signal.

7. A system comprising:
   a motion adaptive de-interlacer configured to receive and de-interlace an interlaced video signal by
   determining a motion value for each edge of a plurality of edges represented in the interlaced video signal, wherein the motion value for each edge of the plurality of edges corresponds to whether the edge is in motion within the interlaced video signal,
   comparing the motion value of each edge of the plurality of edges to a predetermined threshold value, wherein i) portions of the interlaced video signal representing edges in motion have edges whose motion value is above the predetermined threshold value, and ii) portions of the interlaced video signal not representing edges in motion have edges whose motion value is below the predetermined threshold,
   de-interlacing the portions of the interlaced video signal representing edges in motion in accordance with spatial interpolation, and
   de-interlacing the portions of the interlaced video signal not representing edges in motion in accordance with temporal interpolation; and
   a motion adaptive filter configured to filter the de-interlaced video signal by
   filtering, in accordance with a first amount, the edges of the plurality of edges whose motion value is above the predetermined threshold value, and
   filtering, in accordance with a second amount, the edges of the plurality of edges whose motion value is below the predetermined threshold value,
   wherein the first amount is greater than the second amount; and
   scaling the motion adaptively filtered de-interlaced video signal and outputting the scaled video directly as a progressive signal or indirectly as a film or interlaced signal by using an interlacer after scaling.

8. The system of claim 7 wherein the motion adaptive filter comprises a low-pass filter.

9. The system of claim 7 wherein the motion adaptive filter acquires the motion value from the motion adaptive de-interlacer.

10. The system of claim 9 wherein the motion value is calculated as a pixel by pixel difference between a plurality of frames of the interlaced video signal.

11. The system of claim 7 wherein the motion adaptive filter is part of the motion adaptive de-interlacer.

12. The system of claim 7 wherein the motion adaptive filter is combined with a spatial filter as part of the motion adaptive de-interlacer.

13. The system of claim 12 further comprising a vertical low pass filter combined with the motion adaptive filter.

14. The system of claim 12 wherein the spatial filter is an edge adaptive spatial de-interlacer and the motion adaptive filter combined with the edge adaptive spatial de-interlacer is an edge adaptive filter.

15. The system of claim 7 wherein the interlaced video signal is a progressive scan signal, an interlaced signal, a luminance signal or a chrominance signal.

16. The system of claim 7 wherein the motion adaptive filter receives a film input flag from the motion adaptive de-interlacer and responsive to the film input flag, upon recognition of film input, the motion adaptive filter does not alter the film input.

17. The method of claim 1, wherein the spatial interpolation is accomplished using pixels from the surrounding frame to fill in interpolated areas, and wherein the temporal interpolation is accomplished using pixels from a neighboring frame to fill in interpolated areas.

18. The system of claim 7, wherein the spatial interpolation is accomplished using pixels from the surrounding frame to fill in interpolated areas, and wherein the temporal interpolation is accomplished using pixels from a neighboring frame to fill in interpolated areas.

* * * * *